United States Patent [19]

Paraskevas

[11] 4,192,610
[45] Mar. 11, 1980

[54] METHOD AND DEVICE FOR THE MEASUREMENT OF PHOTOELASTICITY

[75] Inventor: Dimitri Paraskevas, Creil, France

[73] Assignee: Centre Technique des Industries Mecaniques, Senlis, France

[21] Appl. No.: 787,280

[22] Filed: Apr. 13, 1977

[30] Foreign Application Priority Data

Apr. 14, 1976 [FR] France .................................. 76 10923

[51] Int. Cl.² .......................... G01B 11/18; G01J 4/00
[52] U.S. Cl. ....................................... 356/33; 356/35; 356/339
[58] Field of Search ..................................... 356/32–35, 356/114–118, 239, 103–104, 339; 73/88 A, 800; 250/225

[56] References Cited

U.S. PATENT DOCUMENTS 3,589,812  6/1971  Robert et al. .......................... 356/33
3,902,805  9/1975  Redner .................................. 356/33

FOREIGN PATENT DOCUMENTS 2221722  10/1974  France ..................................... 356/33

Primary Examiner—John K. Corbin
Assistant Examiner—Wm. H. Punter
Attorney, Agent, or Firm—McDougall, Hersh & Scott

[57] ABSTRACT

At least four beams of linearly polarized light are produced separately at one and the same point of measurement in a single direction of observation at right angles to a unitary sheet of a specimen of photoelastic material in order to determine the state of mechanical stress in the plane of the sheet.

12 Claims, 4 Drawing Figures

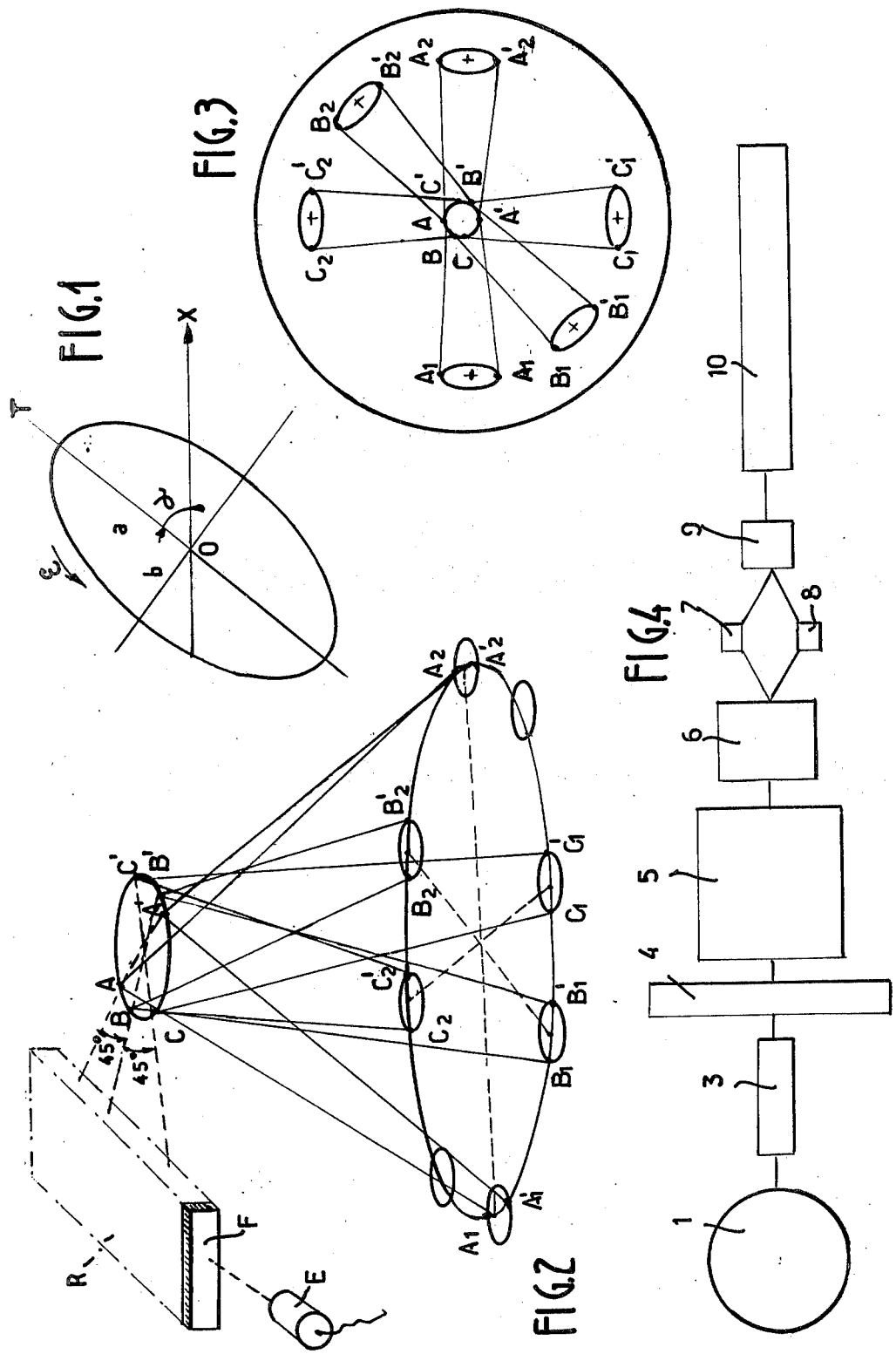

METHOD AND DEVICE FOR THE MEASUREMENT OF PHOTOELASTICITY

This invention is concerned with techniques of measurement of photoelasticity.

It is known that measurement of photoelasticity essentially consists in determining the artificial birefringences produced within a specimen of photoelastic material as a result of mechanical stresses by observing the action of these artificial birefringences on polarized light. It is also known that the measurement of photoelasticity is very useful for studying states of stress of mechanical parts subjected to external forces and for determining the optimum shape of such parts. In this case the specimen which is inspected by the method of measurement of photoelasticity is constituted by a model of the part formed of photoelastic material and subjected to the same external forces.

A study of birefringences in bidimensional geometry is relatively easy and many methods have been developed for the inspection of flat transparent models or of transparent photoelastic films deposited on the parts to be studied. However, the information thus obtained is often distinctly insufficient and completed only to a partial extent by a knowledge of the internal stresses existing in the part if the model employed has been subjected to "frozen stress" by means of a suitable heat treatment in which the stresses are maintained after removal of the forces which produced them. In this case the model can be cut into successive slices or sheets which are then examined individually.

In order to gain access to really three-dimensional information on the states of stress, it is necessary to carry out measurements corresponding respectively to three different orientations which are usually perpendicular in pairs at each point of the model. The frozen stress technique which entails the need to cut-up three different but identical models then becomes prohibitive.

Damaging of the model can be prevented if recourse is had to scattered light phenomena in order to produce polarized light within the material itself at each point of measurement. The method must in that case take into account all the deformations to which the light is subjected during its path through the model after the point of measurement.

In the final analysis, no technically feasible method has yet been found for taking complete three-dimensional measurements of photoelasticity or in other words for determining at any given point and without any ambiguity the directions of the three principal stresses and the values of the three maximum shear stresses.

The present invention is directed to a method and a device for measurement of photoelasticity which is particularly well suited to three-dimensional photoelasticity although not in any limiting sense. The method and device have an advantage over solutions of the prior art in that they can be carried into practical effect under conditions of cost, time and quality of results which are compatible with industrial requirements.

In accordance with a first distinctive feature of the invention, the method of measurement of photoelasticity in accordance with the invention consists in producing four beams of linearly polarized light by Rayleigh scattering in one direction of observation at right angles to a unitary sheet of a specimen of photoelastic material; two of said beams are emitted from a front face of the sheet whilst two others are emitted from the opposite face or rear face of the sheet so as to pass through said sheet; said beams are produced by Rayleigh scattering respectively from four incident beams which are in turn located in the plane of the front face in the case of the first two beams and in the plane of the rear face in the case of the other two beams; the components of the four Stokes vectors representing the corresponding forms of polarized light received externally of the specimen are determined in the common direction of scattering and on each of the four scattered beams; the elements of the Mueller matrix operator representing the transformation to which the polarized light is subjected as it passes through the sheet are determined from the components aforesaid in respect of two different light-wavelengths in succession; and the state of mechanical stress in the plane of the unitary sheet is then deduced therefrom.

In accordance with a more special mode of execution, the invention consists in defining at each point of measurement of a specimen of photoelastic material three sheets of unitary thickness which are oriented differently with respect to each other, in determining in the case of each sheet the state of mechanical stress in the plane of said sheet in the manner which has just been defined and in calculating the characteristics of the state of three-dimensional mechanical stress from the results corresponding respectively to each unitary sheet.

The definition of the Stokes vector and that of the Mueller operator are known to those versed in the art and will be recalled a little later in this description.

In accordance with this invention, each beam of linearly polarized light is produced by scattering, by directing towards the point of measurement an incident beam of non-polarized light which is parallel or focused at said point and the direction of propagation of which is perpendicular to the direction of observation of the scattered light.

The method in accordance with the invention thus makes it possible to inspect any unitary sheet located within a model or specimen of transparent photoelastic material. A model of any desired type is preferably immersed in a liquid having an identical refractive index; in the direction of observation, said liquid is contained behind a transparent window which is perpendicular to said direction of observation.

Secondary features of the invention which facilitate measurements and calculations are especially as follows:

the two chosen planes of polarization (and therefore the two incident beams which give rise to these latter as a result of scattering) are inclined to each other at an angle of 45 degrees;

one of these planes of polarization is parallel or perpendicular to the reference direction which is chosen so as to define the Stokes vectors in respect of the corresponding sheet;

the photoelastic material of the specimen under inspection is substantially devoid of dichroism, with the result that the Mueller operator is always in the form of a matrix having three times three elements.

In the particular case in which the sheet under inspection can be assimilated with a rectilinear birefringent plate, it may be considered necessary in order to determine the Mueller operator of the sheet to inspect three beams of polarized light such that one beam emerges from one of the faces of the sheet with a plane of polarization which is parallel or perpendicular to the reference direction of the Stokes vectors whilst the two other beams emerge from the other face of the sheet with respectively the same plane of polarization at an angle of 45 degrees to the preceding.

It is possible to determine the Stokes vectors by measuring the values of their components by means of any conventional method of ellipsometry, this term being intended to designate the methods which permit automatic determination of the forms of polarized light in orientation, direction and oblateness.

The invention naturally extends to devices which are characterized by means for carrying out the method as defined in this description.

The distinctive features and advantages of the invention will be brought out by the following description of one particular embodiment which is not intended to imply any limitation, reference being made to the accompanying drawing in which:

FIG. 1 illustrates diagrammatically the definition of the light vectors and the corresponding Stokes formula;

FIG. 2 illustrates diagrammatically the different light paths for the inspection of three unitary sheets of a specimen;

FIG. 3 is a top view showing the light paths of FIG. 2;

FIG. 4 is a block diagram showing the assembly for calculating mechanical stresses.

Before describing the invention in the particular embodiment under consideration, it is useful to recall the basic principles in regard to vectorial representation of polarized light and the modification produced thereon by the optical components and more especially in regard to the Stokes vectors and the modifications produced on these latter by the Mueller operators.

Light is formed by electromagnetic waves, the direction of vibration of which is perpendicular at each instant to the direction of propagation and which can be characterized by the corresponding electric vectors. A polarized light wave is characterized in the plane which is transverse to its direction of propagation by two primary orthogonal directions; the measured intensity after traversal of a polarizer is of maximum or minimum value when the polarizer is oriented in either of these two directions. On the basis of these established facts, polarized light is commonly represented by an ellipse as shown in FIG. 1. The major axes of the ellipse represent the two primary directions mentioned above and the oblateness or ratio of the minor axis to the major axis is related to the ratio of extreme intensities. The direction of the ellipse is that of the path of the electric vector on said ellipse.

The orientation of the axes of the ellipse is defined by the angle $\alpha = (OX, OT)$ made with a reference direction OX by the major axis of the ellipse OT and the oblateness is defined by $b/a = |tg\lambda|$. The direction of travel of the ellipse is taken into account by applying the definition $tg\ \lambda = \epsilon b/a$, where a is the value of the major axis of the light ellipse, b is the value of the minor axis and $\epsilon$ is equal to $+1$ if the travel is in the forward direction and to $-1$ if the travel is in the reverse direction.

The angles $\alpha$ and $\lambda$ being thus defined, the polarized light can be characterized by a four-dimensional single-column vector known as a Stokes vector and defined as follows:

$$\vec{S} = \begin{pmatrix} 1 \\ \cos 2\lambda \cos 2\alpha \\ \cos 2\lambda \sin 2\alpha \\ \sin 2\lambda \end{pmatrix} = \begin{pmatrix} 1 \\ A \cos B \\ A \sin B \\ AM \end{pmatrix} \text{ with } \begin{cases} B = 2\alpha \\ M = tg\ 2\lambda \\ A = \dfrac{1}{\sqrt{1 + M^2}} \end{cases}$$

this vector being normed to unity.

If the components B and M of the Stokes vector are known, the light ellipse is fully defined and it is possible to calculate the angle $\alpha$, the oblateness b/a and the direction of travel without ambiguity.

Under these conditions, the action of an optical component which modifies the characteristics of polarized light is defined by a square matrix of four times four elements known as a Mueller matrix which operates on the Stokes vector of the incident polarized light and the Stokes vector representing the emergent light is the result of a matrix product.

One essential property of Mueller operators lies in the fact that, if the optical component represented by said operators is devoid of any dichroic effect, the matrix is reduced to a matrix of three times three elements having the properties of a unitary matrix.

In accordance with the invention, the method of measurement of photoelasticity is applied to the study of states of stress existing in a model or specimen of photoelastic material either by maintaining said model under stress during the measurements or by making use of a model in which the stresses have been "frozen" by means of a suitable treatment.

In more precise terms, the specimen under study is formed of transparent photoelastic material which does not exhibit dichroism and is capable of scattering a light spectrum substantially without fluorescence, with the result that the scattering phenomena within the material takes place under the Rayleigh conditions. Under these conditions, the light which is scattered at 90 degrees to a non-polarized incident light beam is a linearly polarized light at 90 degrees to its propagation direction in a plane at right angles to the plane formed by the direction of incidence and the direction of observation. The material employed can be selected for example from the polyester resins, the methacrylate resins, certain epoxy resins, the polycarbonate resins and so forth.

The specimen is immersed in a liquid having a refractive index which is substantially identical with the mean index of the material of the model under inspection. The refractive index of the liquid can readily be adjusted by employing a mixture of two liquid having different indices, the proportions of which are varied. This liquid is transparent and contained in a vessel provided with transparent windows. These windows are suitably arranged so as to permit the passage on the one hand of the incident beams of non-polarized light which are directed towards the specimen and on the other hand of the emergent beams of light scattered by the specimen, said emergent beams being received outside the vessel and directed towards an ellipsometer.

As shown in FIGS. 2 and 3, twelve different incident beams can be directed in the vicinity of a single point of the specimen. These beams converge in pairs respectively at A, B, C, A', B' and C'. The six points are located on a circle having a small diameter (approximately 1 mm, for example). By means of an arrangement of this kind, the method in accordance with the invention permits the successive inspection of three differently oriented sheets of unitary thickness of the model. In the figure, the directions AA', BB' and CC' represent the three directions which are respectively at right angles to the three sheets considered. The three sheets are illustrated as AA', BB', and CC'. The points A, B and C are located on the front faces of their respective sheets and the points A', B', C' are located on the rear faces. The diameter of the circle represents the unitary thickness of the sheets.

From each of the six windows of the vessel, it is possible to direct two incident beams respectively onto the front face and the rear face of the one and the same sheet, namely the beams $A_1A$ and $A'_1A'$ for example while two incident beams of different orientation, namely the beams $A_1A$ and $A_2A$ or the beams $A'_1A'$ and $A'_2A'$ for example can be directed onto each of these faces from opposite windows. All the incident beams have a propagation direction which is perpendicular to the observation direction (such as AA') constituted by the normal to the corresponding sheet. In consequence, the emergent light received in the observation direction is essentially constituted by linearly polarized light when no stresses are present.

Moreover and in accordance with the preferred mode of execution of the invention, the two beams such as for example the beams $A_1A$ and $A_2A$ which are directed onto the same face of one sheet at the point of measurement are inclined to each other at an angle of 45 degrees. In consequence, the planes of polarization of the scattered beams observed (for example in the direction AA') are also inclined to each other at an angle of 45 degrees, each plane being perpendicular to the plane formed by the incident beam and the observed scattered beam. The beams of scattered light produced from the other face of the same sheet (for example those produced respectively by the incident beams $A'_1A'$ and $A'_2A'$) have respectively the same planes of polarization. Moreover, the directions of the sheets (and therefore the directions AA', BB' and CC') are also at 45 degrees to each other.

The twelve different beams are each directed onto the specimen separately and in turn. A switching system (not shown and of conventional design) can be employed for producing these different beams from a single source of nonpolarized light. A system of this type can comprise twelve different optical fibers for directing the light from said single source to each window.

At the point of reception of the beams of scattered light which have passed through the windows of the vessel and are perpendicular to the corresponding directions of observation, the selection unit R of FIG. 2 contains a deflecting and selecting assembly constituted by a set of prisms which work in reflection at the limiting angle of refraction. Prisms of this type are in conventional use and serve to modify the propagation direction of a beam of polarized light without modifying its polarization. The unit R thus makes it possible to select each beam of scattered light individually and in turn and to direct the selected beam in the axis of an ellipsometer E. The unit R terminates in an optical filter F which serves to perform the measurements in respect of two preset wavelengths.

In the case of each polarized light beam received in the ellipsometer, this latter makes it possible to determine the form of light by means of the components of the Stokes vector in a manner which is known per se.

The method in accordance with the invention will now be explained in regard to the determination of the Mueller operator corresponding to a predetermined sheet, that is to say in regard to the study of light scattered in the direction of observation AA' for example. The Mueller operator of each sheet is determined by a vectorial product from Mueller operators determined in respect of the thicknesses between each face of the sheet and the exit of the assembly formed by the model and the associated liquid.

The first two measurements are carried out on the light which is scattered successively from incident beams focused at A ($A_1A$ and $A_2A$). The object of these measurements is to determine the Mueller operator representing the transformations which the polarized light undergoes as it passes through the photoelastic specimen from the front face (at A) of the sheet under inspection when said specimen which is under stress has the same effect as a birefringent plate.

Since the photoelastic material employed does not exhibit dichroism, the operator is a unitary matrix of the form:

$$[P] = \begin{Bmatrix} 1 & 0 & 0 & 0 \\ 0 & a_{22} & a_{23} & a_{24} \\ 0 & a_{32} & a_{33} & a_{34} \\ 0 & a_{42} & a_{43} & a_{44} \end{Bmatrix}$$

and, since a unitary matrix is involved, any single-column vector is the vector product of the other two columns, e.g.:

$$\vec{V_3} = \vec{V_1} \wedge \vec{V_2}$$

if:

$$\vec{V_1} = \begin{pmatrix} a_{22} \\ a_{32} \\ a_{42} \end{pmatrix} \vec{V_2} = \begin{pmatrix} a_{23} \\ a_{33} \\ a_{43} \end{pmatrix} \vec{V_3} = \begin{pmatrix} a_{24} \\ a_{34} \\ a_{44} \end{pmatrix}$$

In a preferred mode of execution of the method, the reference direction which is chosen for the light vectors representing the light scattered in the observation direction AA' corresponds to one of the incident beams, namely to $A_1A$, for example (it should be noted that said reference direction could also be perpendicular to this latter while retaining the same simplicity of the matrix formalism). At A, we accordingly have the following characteristics for linearly polarized light:

$\alpha = \pi/2 \; \lambda = 0$ in respect of the incident beam $A_1A$ $\alpha = \pi/4 \; \lambda = 0$ in respect of the incident beam $A_2A$ or equivalent characteristics.

Accordingly, the Stokes vectors of the emergent light, the components of which are determined by the ellipsometer, are respectively as follows:

in the case of $A_1A$:

$$\vec{S_1} = \begin{Bmatrix} 1 & 0 & 0 & 0 \\ 0 & a_{22} & a_{23} & a_{24} \\ 0 & a_{32} & a_{33} & a_{34} \\ 0 & a_{42} & a_{43} & a_{44} \end{Bmatrix} \cdot \begin{pmatrix} 1 \\ -1 \\ 0 \\ 0 \end{pmatrix} = \begin{pmatrix} 1 \\ -a_{22} \\ -a_{32} \\ -a_{42} \end{pmatrix}$$

- in the case of $A_2A$:

$$\vec{S_2} = \begin{Bmatrix} 1 & 0 & 0 & 0 \\ 0 & a_{22} & a_{23} & a_{24} \\ 0 & a_{32} & a_{33} & a_{34} \\ 0 & a_{42} & a_{43} & a_4 \end{Bmatrix} \cdot \begin{pmatrix} 1 \\ 0 \\ 1 \\ 0 \end{pmatrix} = \begin{pmatrix} 1 \\ a_{23} \\ a_{33} \\ a_{43} \end{pmatrix}$$

The elements of the operator P are therefore calculated by means of the relations:

$$\vec{V_1} = -\vec{S_1} \quad \vec{V_2} = \vec{S_2} \quad \vec{V_3} = \vec{V_1} \wedge \vec{V_2}$$

Two ellipsometric measurements are sufficient for the purpose of determining said elements although the invention is not necessarily limited by this number of measurements.

It should also be pointed out that, while it is found preferable to make use of incident beams $A_1A$ and $A_2A$ at $\pi/4$ with respect to each other, it is also possible without thereby departing from the scope of the invention to make use of two incident beams having different orientations as may be required. In this case, the two ellipsometric measurements supply linear combinations between two column vectors of the operator which are of the type:

$$\vec{S_1} = \alpha \vec{V_1} + \beta \vec{V_2}$$
$$\vec{S_2} = \gamma \vec{V_1} + \delta \vec{V_2}$$

and which make it possible to calculate these two column vectors and then the third by means of a vector product.

Two similar ellipsometric measurements are performed in respect of the emergent beams produced from the incident beams focused at $A'$ after scattering on the rear face of the sheet. The two incident beams $A'_1A'$ and $A'_2A'$ are oriented respectively in the same manner as the beams $A_1A$ and $A_2A$ but these preferred conditions are not limitative. There is determined in the same manner as described above the operator $[Q]$ representing the transformations which the polarized light undergoes when passing through the birefringent specimen and the sheet from the rear face of the sheet.

The four ellipsometric measurements make it possible in the aggregate to calculate the operator $[\pi]$ representing the sheet itself along $AA'$ by utilizing the transposed matrix of the unitary operator $[P]$ by means of the relation:

$$[\pi] = [P]^{-1} \cdot [Q]$$

The same operations are performed in the case of the other two sheets in the observation directions $BB'$ and $CC'$. The entire series of measurements accordingly makes it possible to determine completely in three-dimensional geometry the optical characteristics of the specimen under stress at the point of measurement which is materialized by the elementary circle $ABC$ $A'B'C'$.

The operations mentioned above are simplified in an alternative mode of execution of the invention which is applicable in the particular case in which the unitary sheets under inspection can be assimilated with a rectilinear birefringent plate.

In this case, three ellipsometric measurements are sufficient to determine the characteristic operator $[\pi]$ of a sheet. In fact, the properties of the Mueller-Stokes formalism are such that, when the sheet does not have any rotatory power, the elements of the matrix $[\pi]$ are related to each other, with the result that they can be defined solely by means of the terms of the first column. In fact, these latter are defined by the matrix product of the terms of $[P]^{-1}$ and the terms of the first column of $[Q]$. Two measurements performed in respect of two beams focused on the front face of the sheet make it possible to determine the operator $[P]$ and therefore $[P]^{-1}$ whilst a measurement performed in respect of a beam focused on the rear face and oriented in the reference direction of the light vectors makes it possible to determine the first column of $[Q]$, that is to say the vector $[V_1]$.

In all cases, the measurements resulting in the operators $[\pi]$ representing respectively each of the three unitary sheets are carried out successively in respect of two different wavelengths of the light detected by the ellipsometer. The usefulness of this arrangement is related to the application of the invention to determination of the characteristics of mechanical stresses. These latter can be calculated automatically by means of the different items of information constituted by the components and vectors of the operations determined in the foregoing.

FIG. 4 again shows the block diagram of the assembly for carrying out the method hereinabove described. The reference 1 designates the immersion vessel together with the device for illuminating with the incident beams, the reference 3 designates the ellipsometric unit, the reference 4 designates the computer for the Stokes vectors. The data which characterize the four beams by means of the values $B = 2\alpha$ and $M = tg\ 2\lambda$ corresponding respectively to these latter are collected at 5. By means of these data, the operators of each sheet are computed at 6, then stored at 7 and 8 respectively in the case of each of the two wavelengths employed. A mixing unit 9 processes the values of the two operators corresponding to the two wavelengths in order to deduce the mechanical characteristics of the sheet therefrom. Said characteristics are recorded at 10 in the form of values of shear and orientation.

Finally, the specimen under inspection can be displaced within the vessel in which it is immersed in order to pass from one measuring point to another. The vessel itself and all the optical equipment preferably remain stationary.

One important advantage of the method herein described lies in the fact that it permits full automation of measurements since all the optical beams employed have predetermined positions which remain stationary during the entire procedure at a measuring point.

Calculation of stresses can be carried out by passing through the characteristics $R$, $\theta$ and $\phi$ of each sheet, by designating the rotatory power as $R$, by designating the orientation of the major axis relative to the reference axis as $\theta$ and by designating the phase shift as $\phi$. Calculation of stresses by means of the values $R$, $\theta$ and $\phi$ conforms to standard practice. Determination of these values by means of the Mueller operations results from calculations which are within the capacity of anyone versed in the art. In the case for example of a sheet assimilated with a rectilinear birefringent plate which does not have any rotatory power, the characteristics of the matrix $[\pi]$ are determined from the terms $a_{22}$, $a_{32}$, $a_{42}$ by means of the relations $$\cos \phi = \frac{a_{42}^2}{1 - a_{22}} - 1$$

$$\sin 2\theta \sin \phi = -a_{42}$$

$$tg\ 2\theta = \frac{1 - a_{22}}{a_{32}}$$

The characteristics of the sheet and therefore the states of stress are obtained in a univocal manner once the ambiguities have been removed from $\phi$ (as measured to within $2\pi$) by employing the results found in the case of the two wavelengths. In fact, if $\phi_1$ and $\phi_2$ are the phase displacements corresponding to the wavelengths $\lambda_1$ and $\lambda_2$, it is known that $\phi_2/\phi_1 = \lambda_1/\lambda_2$. Postulating that $\lambda_2 < \lambda_1$, this makes it possible to calculate:

$$\cos(\phi_2 - \phi_1) = \cos\left[(\frac{\lambda_1}{\lambda_2} - 1)\phi_1\right]$$

It proves an advantage in practice to choose values of wavelengths which have a minimum deviation with respect to each other of 5% and preferably of the order of 8 to 15% with respect to the value of $\lambda_2$. In consequence, it can always be assumed that $$(\lambda_1/\lambda_2 - 1)\phi_1 \leq \pi$$

There will now be described by way of example one type of ellipsometer which can be employed for determining the components of Stokes vectors.

The device herein described utilizes a method which consists in subjecting the polarized light to a predetermined periodic modulation, especially by interposing on its path an analyzer which is driven in rotation, in subjecting said polarized light in addition to a preliminary phase shift which can assume two different predetermined values such that one value can be zero if necessary, in detecting the variations in intensity of the emergent modulated light in respect of each of the two values of phase shift, in determining in both cases the phase difference of these variations with respect to a reference signal and in deducing therefrom the components of the Stokes vector representing the incident polarized light. The reference direction of the Stokes vector corresponds to a zero phase difference with respect to the reference signal when there is no phase shift prior to modulation.

The phase shift imposed prior to modulation is advantageously obtained by means of a retractable birefringent plate in which one of the principal axes and especially the fast axis is preferably oriented in the reference direction of the Stokes vectors in the position in which said plate is interposed on the light path. In order to make the calculation of the components of the Stokes vector even more simple, it is an advantage to employ a quarter-wave plate for the light which is being examined.

The device employed comprises in succession on a polarized light path a retractable phase-shift plate, an analyzer associated with means for driving said plate in rotation at constant speed, a quadratic detector such as a photomultiplier for delivering an electric signal which is proportional to the intensity of the emergent light from the analyzer, a phasemeter for determining the phase difference between said signal and a reference signal, and means for calculating the Stokes vector representing the incident light from two values of the phase difference which are obtained respectively when the phase-shift plate is withdrawn and when said plate is interposed in front of the analyzer, from the characteristics of orientation and of phase shift of the plate and from the speed of rotation of the analyzer.

The operation of the ellipsometer in the determination of light vectors will now be explained in detail.

In the case of polarized light defined by the angles $\alpha$ and $\lambda$ of the corresponding light vector, the intensity detected in the form of an electric signal by the photomultiplier at the output of the analyzer which carries out the modulation is of the form:

$$I = I_0/2[I + \cos 2\lambda \cos 2(\omega t - \alpha)]$$

this being achieved without the phase-shift plate L and by designating the angular frequency of the rotating analyzer as $\omega$.

The detected signal which appears is thus composed of a direct-current voltage and of an alternating-current voltage at $\cos 2(\omega t - \alpha)$. The phase $2\alpha$ of the alternating-current signal with respect to a reference signal at $\cos 2\omega t$ related to twice the speed of rotation of the analyzer provides the orientation of the major axis of the incident light ellipse. The reference signal corresponds to that obtained in respect of incident linearly polarized light oriented in the reference direction chosen for the definition of the light vectors. Measurement of the amplitude of the direct-current portion of the signal and measurement of the amplitude of the alternating-current portion would make it possible to determine their ratio $A = \cos 2\lambda$ but these measurements are not necessary in the practical application of the invention.

The incidence of the birefringent plate when this latter is interposed in front of the analyzer results in a transformation of the Stokes vector by a Mueller operator in which the elements are a function of the characteristics of phase shift and orientation of the plate; this operator is reduced to a four-element rotation matrix if the plate is oriented in such a manner as to ensure that its fast axis is either parallel or perpendicular to the reference direction.

In particular, if the fast axis of the plate is oriented in the reference direction, the Stokes vector representing the light modified by a plate which produces a phase shift $\phi$ is deduced from the incident vector by the matrix relation:

$$\begin{Bmatrix} I \\ S'_x \\ S'_y \\ S'_z \end{Bmatrix} = \begin{Bmatrix} 1 & 0 & 0 & 0 \\ 0 & 1 & 0 & 0 \\ 0 & 0 & \cos\phi & -\sin\phi \\ 0 & 0 & \sin\phi & \cos\phi \end{Bmatrix} \cdot \begin{Bmatrix} I \\ S_x \\ S_y \\ S_z \end{Bmatrix}$$

namely:

$$\begin{Bmatrix} I \\ S'_x \\ S'_y \\ S'_z \end{Bmatrix} = \begin{Bmatrix} I \\ S_x \\ S_y \cos\phi - S_z \sin\phi \\ S_y \sin\phi - S_z \cos\phi \end{Bmatrix}$$

On the basis of this relation and the relation between the components of the Stokes vector, namely:

$$S_x^2 + S_y^2 + S_z^2 = I,$$

whence $$S_z^2 = I(S_x^2 + S_y)^2 = I - A^2$$

it can be demonstrated by calculation that the components can be determined solely from the phase differences $2\alpha = B$ and $2\alpha' = B'$ as measured respectively at the exit of the photomultiplier, both without and with the phase-shift plate $\phi$. In fact:

$$S_z \sin\phi = S_y \cos\phi - S'_y = A \sin B \cos\phi - S'_y$$

$$\text{and } S'_y = S'_x \frac{\sin B'}{\cos B'} = S_x \frac{\sin B'}{\cos B'} = A \sin B' \frac{\cos B}{\cos B'}$$

$$\text{whence: } I - A^2 = \frac{I}{\sin^2 \phi} (A \sin B \cos \phi - A \sin B' \frac{\cos B}{\cos B'})^2$$

Starting from B, B' and $\phi$, it is possible to calculate the value of:

$$M = \frac{I}{\sin \phi} (\sin B \cos \phi - \sin B' \frac{\cos B}{\cos B'})$$

and since $A^2(I+M^2)=I$, whence $A=I/\sqrt{I+M^2}$ it is possible to deduce the components of the incident Stokes vector:

$$S_x = \frac{\cos B}{\sqrt{I+M^2}}; S_y = \frac{\sin B}{\sqrt{I+M^2}}; S_z = \frac{M}{\sqrt{I+M^2}}$$

The calculation of M and of $S_x$, $S_y$ and $S_z$ is performed automatically by a digital computer to which is addressed the signal supplied by the phasemeter, successively in the case of B and B'.

I claim:

1. A method of measurement of photoelasticity wherein said method consists in producing separately at one and the same point of measurement of a specimen of photoelastic material four beams of linearly polarized light by Rayleigh scattering in one direction of observation at right angles to a unitary sheet of said specimen, two of said beams being emitted from a front face of the sheet whilst the two others are emitted from the opposite face or rear face of the sheet so as to pass through said sheet, said beams being produced by Rayleigh scattering respectively from four incident beams which are in turn located in the plane of the front face in the case of the first two beams and in the plane of the rear face in the case of the other two beams, in determining in the common direction of scattering and on each of the four scattered beams the components of the four Stokes vectors representing the corresponding forms of polarized light received externally of the specimen, in determining from said components the elements of the Mueller matrix operator representing the transformation to which the polarized light is subjected as it passes through said sheet, in carrying out the aforesaid determination of the Mueller operator in respect of two different light-wavelengths in succession, and in deducing therefrom the state of mechanical stress in the plane of the unitary sheet.

2. A method of measurement of photoelasticity, wherein said method consists in defining at each point of measurement of a specimen of photoelastic material three sheets of unitary thickness which are oriented differently with respect to each other, in producing separately in the case of each one of said sheets at least four beams of linearly polarized light by Rayleigh scattering in the same direction of observation at right angles to said sheet and at the point of measurement, two of said beams being produced on a front face of said one sheet whilst the other two beams are scattered from the opposite face or rear face of said one sheet so as to pass through said sheet, said beams being produced by Rayleigh scattering respectively from four incident beams which are in turn located in the plane of the front face in the case of the first two beams and in the plane of the rear face in the case of the other two beams, in determining along the common scattering direction and on each of the four scattered beams the components of the four Stokes vectors representing the corresponding forms of polarized light received externally of the specimen, in determining from said components the elements of the Mueller matrix operator representing the transformation which the polarized light undergoes as it passes through said sheet, in carrying out said determination of the Mueller operator successively in respect of two different light-wavelengths, and in calculating the characteristics of the mechanical stresses of the specimen at said point of measurement by means of the respective Mueller operators of the three sheets.

3. A method according to claim 1, wherein the planes of polarization of the two beams emitted from one and the same sheet face are inclined at an angle of 45 degrees to each other.

4. A method according to claim 1, wherein one of the planes of polarization of the two beams emitted from the front face of said sheet and one of the planes of polarization of the two other beams emitted from the rear face of said sheet are parallel or perpendicular to the reference direction of the Stokes vectors for said sheet.

5. A method according to claim 1, wherein the photoelastic material is substantially devoid of dichroism.

6. A method according to claim 1, wherein the specimen is immersed in a liquid having a refractive index which is substantially identical with the mean index of the photoelastic material.

7. A method according to claim 1, wherein said method consists in determining from the Stokes vectors of the light received in respect of the different beams on the one hand the Mueller operator representing all the transformations experienced by the beams issuing from the front face of the sheet and on the other hand the Mueller operator representing all the transformations experienced by the beams issuing from the rear face of the sheet and in deducing the operator which is representative of the sheet by means of a vector product.

8. A device for the measurement of photoelasticity, wherein said device comprises means for carrying out each of the successive steps of the method according to claim 1.

9. A method according to claim 2 wherein one of the planes of polarization of the two beams emitted from the front face of each one of said sheets and one of the planes of polarization of the two other beams emitted from the rear face of said one sheet are parallel or perpendicular to the reference direction of the Stokes vectors for said one sheet.

10. A method according to claim 9 wherein the planes of polarization of the two beams emitted from one and the same sheet face are inclined at an angle of 45 degrees to each other.

11. A method according to claim 2 comprising determining from the Stokes vectors of the light received in respect of the different beams on the one hand the Mueller operator representing all the transformations experienced by the beams issuing from the front face of each one of the said sheets and on the other hand the Mueller operator representing all the transformations experienced by the beams issuing from the rear face of said one sheet and in deducing the operator which is representative of said one sheet by means of a vector product.

12. A device for the measurement of photoelasticity comprising:

a vessel for the immersion of a photoelastic model, means for successively directing in the vicinity of a point of measurement of the model twelve beams of nonpolarized light comprising three groups of four beams corresponding to three observation axes which are different from said point of measurement and, in each group, the four beams being perpendicular to the corresponding observation axis, two pairs of two beams being inclined at a predetermined angle to each other and directed towards a point of the observation axis which is the same in the case of the two beams of a same pair but different from one pair to the other, means for directing successively each of the beams received along each of the three observation axes towards an ellipsometer, means to select two different wave lengths ahead of said ellipsometer, means in said ellipsometer for determining the components of the Stokes vector corresponding to the polarized light directed thereto for each successive beam, means to determine from said components obtained for each of said wave lengths for each of said pairs of beams, the elements of the Mueller matrix operator representing the transformations experienced by the light along each of said observation axis and to deduce therefrom the Mueller matrix operator representing the transformations experienced by the light passing through a sheet of material between the respective said points for the two pairs of beams in each of said groups, and means to calculate from the various Mueller matrix operators thus determined the mechanical stresses at said point of measurement.

* * * * *